US006537375B1

(12) United States Patent
Flauss

(10) Patent No.: US 6,537,375 B1
(45) Date of Patent: Mar. 25, 2003

(54) METHOD AND DEVICE FOR APPLYING DIFFERENT COLORED FLOCKS TO PROFILED JOINTS

(75) Inventor: Hasso Flauss, St. Wendel (DE)

(73) Assignee: Saar-Gummiwerk GmbH, Wadern-Buschfeld (DE)

( * ) Notice: Subject to any disclaimer, the term of this patent is extended or adjusted under 35 U.S.C. 154(b) by 0 days.

(21) Appl. No.: 09/423,338
(22) PCT Filed: Mar. 24, 1998
(86) PCT No.: PCT/DE98/00873
§ 371 (c)(1),
(2), (4) Date: Nov. 22, 1999
(87) PCT Pub. No.: WO99/48615
PCT Pub. Date: Sep. 30, 1999
(51) Int. Cl.⁷ ............................. G03G 15/00; B44C 1/00
(52) U.S. Cl. ..................... 118/410; 427/200; 427/206; 29/417; 29/527.2
(58) Field of Search ............................... 29/527.2, 417; 118/411, 412, 410; 427/200, 206, 462, 463, 464; 428/90; 28/163, 169, 170

(56) References Cited

U.S. PATENT DOCUMENTS

| 3,793,050 | A | | 2/1974 | Mumpower, Jr. | |
|---|---|---|---|---|---|
| 4,233,027 | A | * | 11/1980 | Albero | |
| 4,385,588 | A | * | 5/1983 | Bennetot | |
| 4,483,893 | A | * | 11/1984 | Harrold | 428/90 |
| 5,047,103 | A | * | 9/1991 | Abrams et al. | 427/206 |
| 5,123,988 | A | | 6/1992 | Iwasa | |
| 5,201,117 | A | * | 4/1993 | Wright | 29/417 |
| 5,343,609 | A | * | 9/1994 | McManus | 29/527.2 |
| 5,477,250 | A | * | 12/1995 | Larson | |
| 5,529,650 | A | | 6/1996 | Bowers et al. | |

FOREIGN PATENT DOCUMENTS

| FR | 2 088 059 | | 1/1972 |
|---|---|---|---|
| JP | 57-56073 | * | 3/1982 |
| JP | 57 056 073 | | 4/1982 |
| JP | 09-155242 | * | 6/1997 |

OTHER PUBLICATIONS

English Translation of JP 57–56073.*
English Translation of FR 2,088,059.*
FR 2088059 English Abstract, Dec. 1972.*

* cited by examiner

Primary Examiner—Gregory M. Vidovich
Assistant Examiner—Eric Compton
(74) Attorney, Agent, or Firm—James Creighton Wray; Meera P. Narasimhan

(57) ABSTRACT

According to the invention, different coloured and/or different types of flocks (8, 9) are applied to cover or flock-coat profiled joints or other profiled sections (11) in predetermined areas in a coating station (3) at the very moment when the required holes and separating cuts are made in the cutting and drilling station (4). The flock cabin (10) is divided up in to partial cabins (15, 17, 19) by means of partitions (16, 18) which can be displaced in a corresponding manner towards the profiled section (11) or brought tightly against it. Instead of the above-mentioned partitions (16, 18) or in addition to the partitions (16, 18), axially separating partitions (29, 30) extending in a longitudinal direction of the profiled section (11) are provided. The inventive method enables various coating areas (35, 36, 37) to be obtained on one single profiled section. This makes it possible, for instance, to adapt precisely defined areas, e.g., joint elements in a car body, to the colour of the car or fittings.

11 Claims, 3 Drawing Sheets

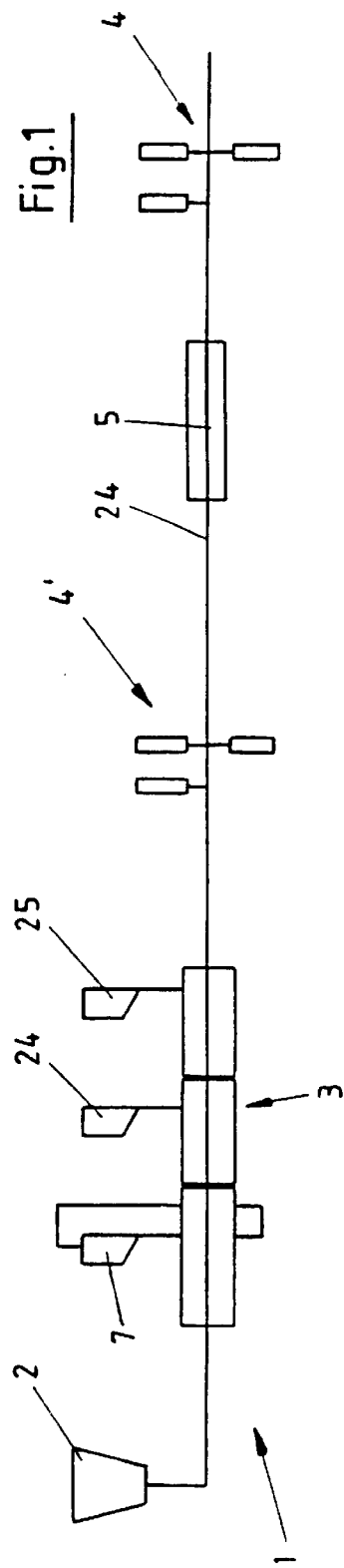
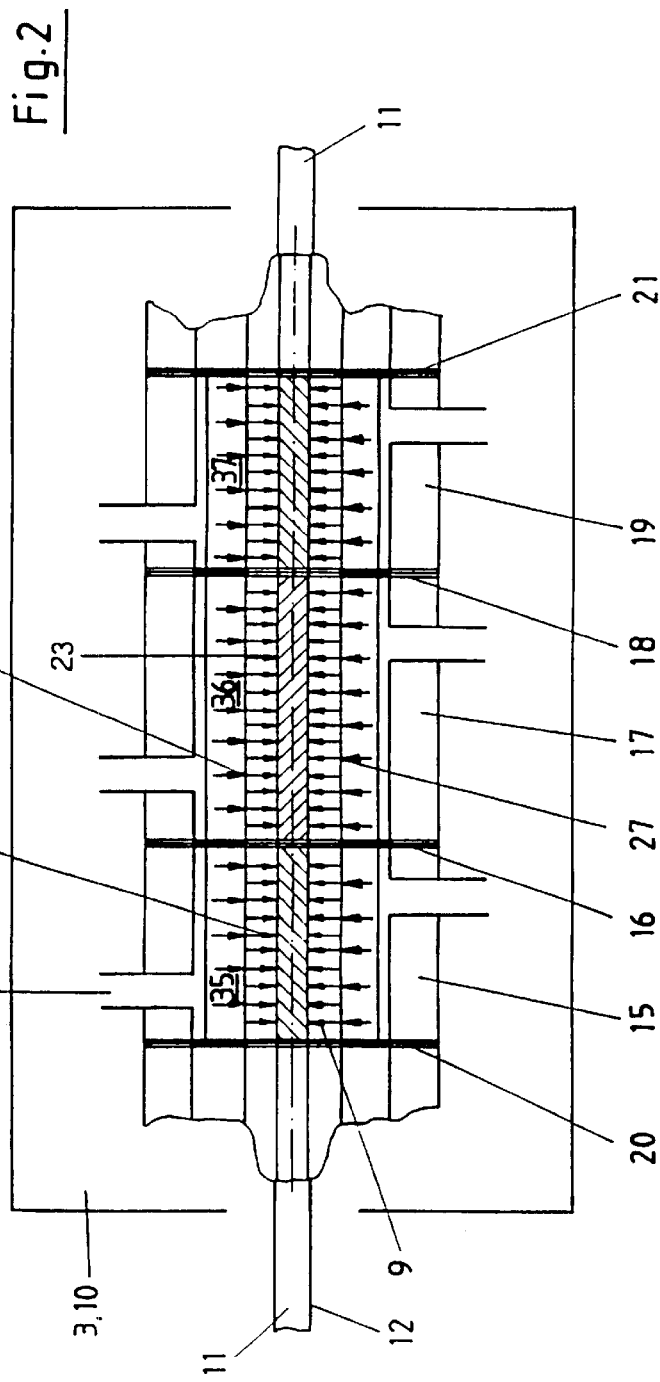

METHOD AND DEVICE FOR APPLYING DIFFERENT COLORED FLOCKS TO PROFILED JOINTS

BACKGROUND OF THE INVENTION

The invention concerns a process for applying different colored flocks and/or types of flocks to a profiled section of profile serving especially as an automobile body into which, after extrusion, the flock is deposited and bore holes and separation cuts are introduced. The invention furthermore concerns a device for implementing the process with coating, cutting to size and drilling as well as drying and cleaning stations connected with the extruder and which are joined with each other over a transport and guide facility for the profile, whereby the coating station has available storage space for the flock as well as a flock cabin.

Sections of this type, especially profiled joints, are generally made of plastic, whereby the elements of the section which do not serve for sealing or for other tasks are coated with flocks of a color which, for example, is adapted to the color of the automobile, or which corresponds thereto. This is especially advantageous with rubber sections, which as a rule have a black color, because they clearly contrast these black profiled joints from the color of the automobile or the color of the interior space of a vehicle. The flocks are applied in a coating station to the section, whereupon the section cord runs through a drying station and then is cut to length and provided with the necessary bore holes. It is disadvantageous that with the previous processes and with the devices provided for these that coating is possible only with one type of flock or one color, whereby the change from one type of flock to another or a corresponding change in color requires considerable conversion operations. Coating here takes place on the running section cord, which then must be stopped for a short time in the cutting and boring station in order to be able to introduce the separation cutting or the boring. It is consequently not possible to undertake different coatings of sections of this type in stages or subdivided in another manner.

SUMMARY OF THE INVENTION

Underlying the invention is therefore the object of creating a process and a device with which sections in exactly defined regions are to be provided with a different color and/or constructed flock coating.

This objective is accomplished in accordance with the invention in that the flock is deposited into the still-standing section simultaneously with the production of the bore holes and separation cuttings, and subdivided into previously set coating areas kept separate from one another.

With a process of this type, it is first of all possible to apply a different color or a different type of flock to various coating areas of the section at the same time and to be sure that they are precisely separated from one another because the coating takes place at exactly the moment in which the section must be detained on account of the necessary application of the bore holes and separating cuts. Owing to the defined areas which must be adhered to with great precision, there exists the possibility of applying, for example, red or blue or green or other color flocks to a specified component area of a profiled segment, while the adjoining area is provided with a wholly different color coating. Flocks also applied to prevent sticking capacity may, for example, be installed in different colors in the sealing area of a car frame profiled joint perpendicular to the longitudinal axis, or even in the direction of the long axis, in order thus to comply with necessities or even taste. Further details on this have yet to be explained further in which connection it is decisive that the respective coating areas can be kept precisely separated from each other.

According to an appropriate construction of the invention, it is provided that the deposition of the flock is undertaken into the still-moist adhesive bed of the section. The coating station is for this reason to be arranged immediately behind the extrusion station, whereby the adhesive bed is at the same time rapidly normalized by applying the flock so that under certain circumstances a subsequent drying and cleaning station is not necessary.

It has already been mentioned further above that the corresponding coating areas can have separation lines as they correspond to the respective requirements. The invention therefore provides that the flocks are applied to the section separately with respect to color and/or type transverse to and/or along the section. Supplementally, the invention provides that the coating areas are partitioned from each other with flock bombardment of various colors or different types in the longitudinal direction of the section and/or across the section. Through a corresponding partitioning, that is, in lowering the separation walls until they are right on the section, it is assured that the respective border areas remain clearly separated from each other, even if, for example, red and green flocks are to be applied in appropriately adjacent coating areas. A mixed coating does not occur unless such is specifically desired from the customer in question. The possibility of specifying and adhering to clear boundaries here results in considerable advantages.

With relatively thin coating of sections, but also with high grade sections, it is advantageous if the continuously guided section is further conditioned following coating with different flocks in a drying and cleaning station. Subsequently, cutting to length or application of bore holes takes place in order to prepare the individual segments appropriately for the respective use. First to generate clear and clean border areas and secondly to be able to assure a complete utilization of the flocks, it is provided that excess flocks are sucked off separated according to color and/or type and in any given case fed into a selected storage space. As a rule, it is a matter of the same storage area which is allocated to the respective coating segment. The excess or remaining flocks are consequently put into circulation and applied, if need be, to the section in connection with the next bombardment.

A device in connection with which the flock cabin is subdivided into separate component cabins by separation walls lowered to the section serves to implement the process, which are in any given case proportioned lengthwise corresponding to the length of the segments of the section to be coated with different flocks and the transport facility is comprehensively configured with section so that each component cabin is allocated a storage space and that the transport facility and the flock discharges of the flock cabin are constructed by alternate activation. By selecting the term "flock cabin" for the basic part of the device, it has already been made clear that it is a matter of a closed and quasi-partitioned unit in which the coating takes place. This flock cabin is or can be subdivided into different component cabins in order to specify different coating segments perpendicular to the long axis of the section or, as further explained above, in the longitudinal direction as well. The section to be coated runs into the flock cabin or its component cabins, whereupon at the same time the coating of the different segments is undertaken the flock provided in each case for this purpose. When detaining the section that is thus in connection with halting the transport facility, flock discharges of the flock cabins or component cabins are activated which in the same moment bombard the still-moist adhesive bed of the section with flock. If the boring and cutting to length operations are concluded, the coating is also finished and the flock discharges from the flock cabin are stopped when the transport facility starts again. Since the size of the component cabins is specified in advance, an exact adherence to the separation cuttings can be maintained in this way for the different types of flock or colors of flock.

According to a further appropriate construction, it is provided that the partitions of the component cabins are constructed displaceable individually and/or in groups in the longitudinal direction of the section. This way, the dimensions of the component cabins can be changed practically at will, and the coating segments can therewith also be altered in their lengths. There also exists the possibility, however, of adapting the coating station to the requirements in its overall position. It is clear that a change of the coating segments is possible not only in the longitudinal direction of the section, but also crosswise in relation to this.

In order to prevent some flocks from reaching the environment when bombarding the profile with them, the invention provides that the component cabins are constructed enclosing the section and the section fixing element of the transport facility. The component cabins or the flock cabins thus represent overall a closed unit which can be altered as described in its position and component lengths, which, however, always ensures that the coating process transpires as a complete operation.

In order to be able to adhere to the coating segments in the longitudinal direction of the section as well, it is provided in accordance with the invention that the component cabins are outfitted with axial partitions running parallel to the long axis of the section. These axial partitions, which correspond to the separation lines in the construction, ensure that, viewed from the size of the section, coating segments of different color or different type can also be maintained. In this connection, it is also of advantage if axial partitions are provided in addition to the separation walls whereby they are displaceable separately in direction on the section, or are to be pulled away from these, so that corresponding to the needs in any given case, different coating segments are attained and can be adhered to without an extensive conversion of the entire flock cabin becoming necessary.

A further optimization of the adaptability of the device of the invention is reached in that several flock cabins are provided one behind the other or at a distance to one another, encompassing a segment of the section. By shutting off or cutting in flock cabins appropriately separated from one another, a further variation possibility is attainable in connection with coating sections.

It was already pointed out above that it is appropriate for several reasons not to discharge the remaining flocks into the environment, but rather to make them available for a renewed bombardment. This is attained in accordance with a construction of the invention, since below the horizontal separating wall of the component cabins, collection rooms for the remaining flocks are arranged and connected with the allocated storage spaces. Either a corresponding amount of remaining flock can first of all be collected in the collection rooms and then conveyed into the storage space, or there also exists the possibility of continuously blowing in the remaining flock over the collection room into the respective storage space.

An especially intimate connection of flocks with the section is attained if the bombardment takes place on the still-moist adhesive bed. This can be guaranteed if, as provided in accordance with the invention, the section fixing element of the transport facility is constructed holding the section with the still-moist adhesive bed facing the flock discharges. Also, with a running or stopped section, a sliding and therewith a twisting of the still-moist adhesive bed is thus avoided. The section fixing element always aligns the corresponding area of the section exactly such that the surface of the section and the flock discharges ensure an exact bombardment.

The invention is in particular distinguished by the fact that a process as well as a device are created with which sections can be coated in exactly defined coating areas with different color or different type flocks. At the same time, the invention makes use of the fact that the section must in any case be detained for a short period of time during its conditioning process owing to the necessary cutting to length and creation of bore holes. Exactly at this moment, the bombardment of the section with flocks takes place in the coating station, and therewith an optimal construction of corresponding sections in particular usable as car frame sealing. The coating station is integrated into the extrusion length or forms a unit with this and the further stations so that the entire conditioning process can be conducted meticulously in detail. The section to be coated is conducted into the appropriate station by means of the transport facility, whereby the transport facility stops for a short time upon reaching a defined position. Here the machining period for drilling and cutting the section are utilized. In this waiting position, the different color or different type flocks are deposited on the areas previously set. Following this process, the transport facility is set into operation again, and the next area to be coated moves into the station. The already-coated part of the section runs through the further stations so that subsequently an exactly specified segment of the section stands available for use. The flocking facility is designed so that it can contain an unlimited length of an infinite number of colors. For example, it is possible to adapt exactly defined areas to the automobile or equipment color in connection with a car frame sealing.

Further details and advantages of the object of the invention emerge from the following description of the associated drawing in which a preferred embodiment with the details and individual components necessary for this is represented, wherein:

BRIEF DESCRIPTION OF THE DRAWINGS

FIG. 1 presents a schematically reproduced flock facility,

FIG. 2 shows a flock cabin in section,

DETAILED DESCRIPTION

Figure 3:
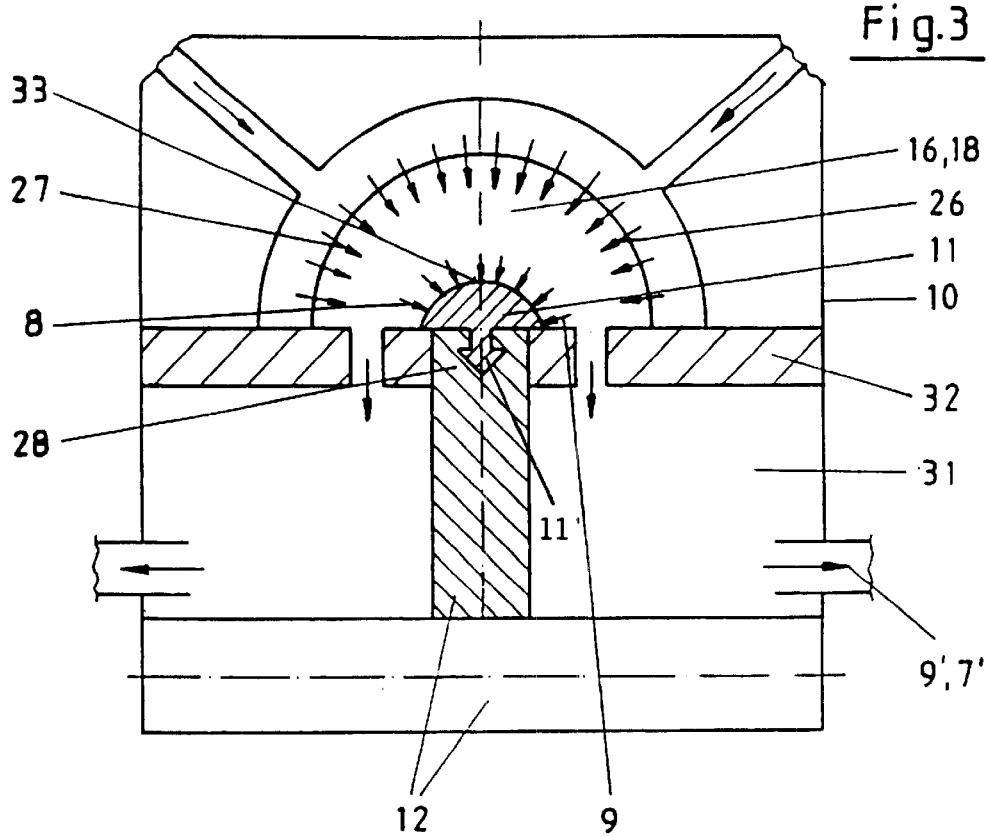
FIG. 3 illustrates a flock cabin in cross-section.

FIG. 1 shows a schematic rendition of the flocking facility 1 with the extrusion station 2 from which the respective section 11 is pulled over the transport and guidance facility 12 and passed along to be conditioned further in subsequent stations. With these stations, it is first a matter of the coating station 3 as well as a drying and cleaning station 5 and the sizing and drilling station 4 or 4'. According to whether a drying and cleaning station 5 is necessary, the sizing and drilling station 4 is positioned after this or allocated directly to the coating station.

In accordance with FIG. 1 and FIG. 2, the respective section 11 runs through a flock cabin 10 which consists of several component cabins 15, 17, 19. Here the flocks 8, 9 withdrawn from a storage space 7 or further storage spaces 24, 25 into the respective component cabins 15, 17, 19 are emitted onto the section 11 in order thus to obtain the necessary and desired coating.

It is indicated in FIG. 1 that the flocks 8, 9 withdrawn from the storage space 7 are passed into circulation, that is, the flocks not picked up in coating are returned to the storage space 7.

The individual component cabins 15, 17, 19 are partitioned off in relation to one another by separation walls 16, 18 and also walled off against the environment by the outer walls 20, 21. In this way, there exists the possibility of applying or bombarding differently colored or different types of flocks 8, 9 on to the section 11 in each of the component cabins 15, 17, 19. A corresponding segment 23 of the section 11 can consequently have a red, a green and a blue coating area 35, 36, 37. FIG. 2 illustrates this accordingly.

It becomes clear on the basis of FIGS. 2 to 5 that the flocks 8, 9 withdrawn from the storage spaces 7, 24, 25 can be selectively shot at the section 11 and separated according to the coating areas 35, 36, 37. For this, each component cabin 15, 17, 19 has available a large number of flock discharges 26, 27 which preferably surround the section in the manner of a circle or a semicircle.

Figure 4:
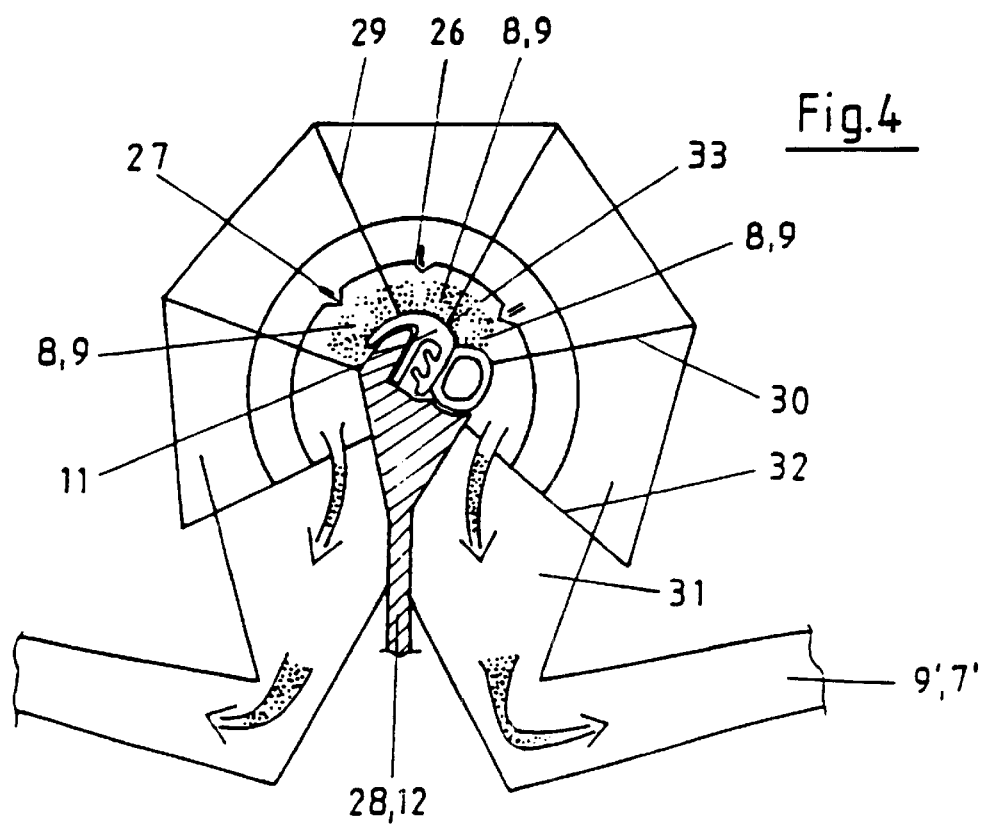
FIG. 4 depicts a further construction of the flock cabin with axial partitions.

The section 11 with the still-moist adhesive bed 33 is introduced to the flock discharges 26, 27 through the section fixing element 28, pointing into the respective component cabins 15, 17, 19 and then selectively bombarded with flocks 8, 9, which can in particular also be gathered from FIGS. 3 and 4.

Figure 5:
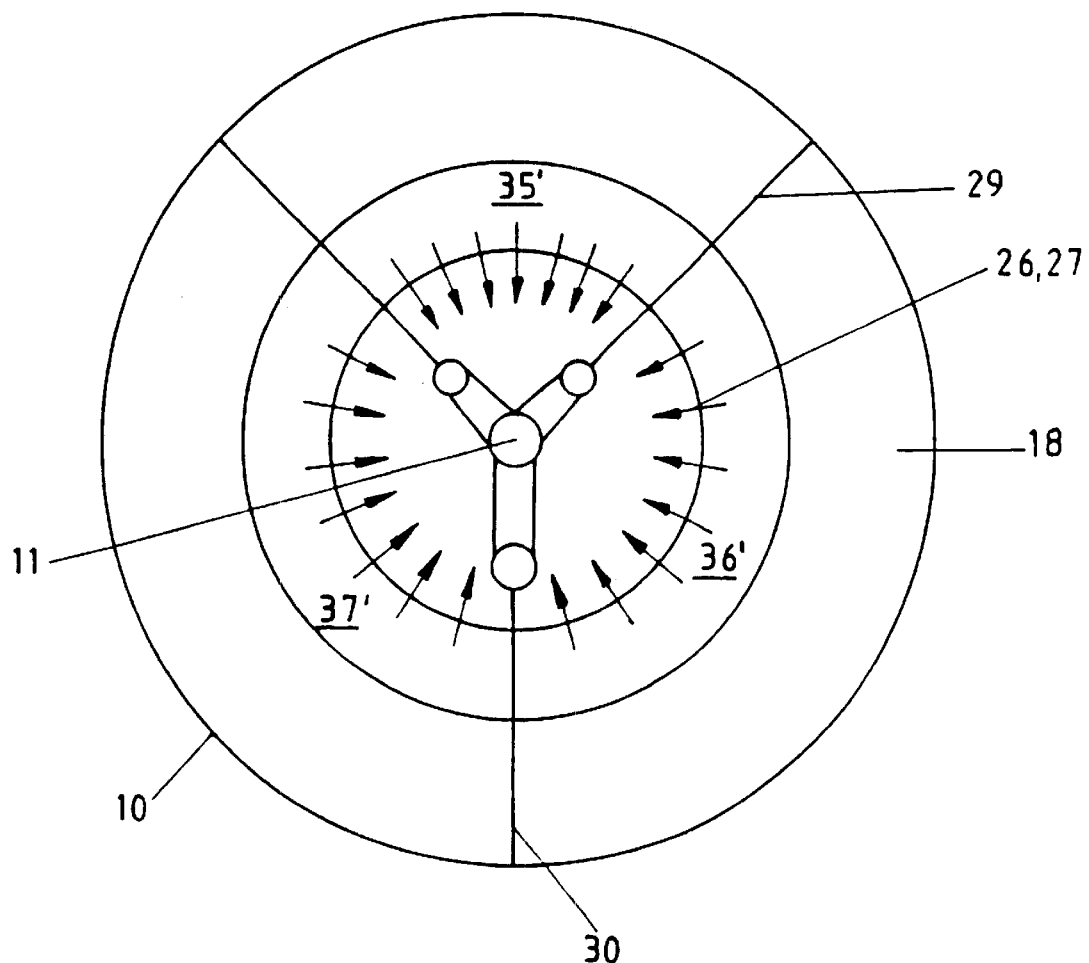
FIG. 5 represents a section through the flock cabin similar to the construction according to FIG. 4.

According to FIG. 4 and FIG. 5, so-called axial partitions 29, 30 are also provided which run parallel to the longitudinal axis of the section 11 while the separation walls 16, 18 are arranged running perpendicular to the long axis of the section. In this way, different coating areas 35', 36', 37' result once again in the peripheral direction of the section 11.

FIG. 3 and FIG. 4 make clear that sections 11, 11' of different construction can be processed with the flock facility. For this, it is merely necessary to allocate an appropriately adapted section fixing element 28 of the transport and guide facility 12. FIG. 4 also shows very clearly that, viewed in the peripheral direction of the section 11, different flocks 8, 9 can be applied which in particular enable an adaptation to the respective contingencies in connection with car body profiled joints.

The flocking facility 1 consists, as mentioned, of different component cabins 15, 17, 19 separated from one another. The size (length) of the component cabins 15, 17, 19 corresponds to the length of the section 11 or segment 23 to be coated in any given case. The segment 23 to be coated (especially rubber section) runs with the still-moist adhesive bed 33 into the flocking facility 1 or the coating station 3. The transport facility 12 is detained for the duration of the flocking process. According to the size and shape of the section 23 to be flocked, the upper part of the coating station 3 can be constructed as movable in part or completely so that the area of the individual multicolored flocks or different flocks can be separated exactly as to section.

In connection with the coating process or simultaneously with it, the remaining flocks are sucked off through the collecting space 31 and returned to the respective storage spaces 7, 24, 25. The collecting space 31 is arranged, for example, below the horizontal separating wall 32, according to FIG. 3, and provides the possibility first of storing flocks in this area before they are then gradually fed to the respective storage area 7, 24, 25. The transport facility 12 is brought into operation following the flocking process and transports the next exactly defined section length or the precisely defined segment 23 into the coating station 3 and the coating process is repeated.

All features mentioned, even those which can be inferred from the drawings alone, are regarded alone and in combination as essential to the invention.

What is claimed is:

1. Apparatus for applying different colored flocks and/or types of flocks to a section surface of profile extrusions comprising coating, sizing, drilling, cutting, drying and cleaning stations provided along an extruder, the stations being inter-connected through a transport and guidance facility for respective sections of extrudate, storage areas in the coating station for different flocks, a flock cabin having plural component cabins, separation walls separating the component cabins, the separation walls being lowerable to the section of the extrudate, the separation walls being spaced corresponding to lengths of respective segments of the sections to be coated with the different flocks, and coatings on the segments being of differing colors and patterns of the flocks, wherein the drilling of holes, separation cutting and flock coating of the sections are simultaneous along the extrudate.

2. The apparatus of claim 1, wherein the flock cabin encompasses an extrudate transport facility.

3. The apparatus of claim 2, wherein each component cabin has a storage space in the transport facility.

4. The apparatus of claim 1, further comprising flock discharges from the flock cabin, wherein the flock discharges are controlled by alternate activation.

5. The apparatus of claim 4, wherein at least one of the separation walls of the component cabins are movable in a longitudinal direction of the sections.

6. The apparatus of claim 5, wherein plural separation walls are movable individually or together.

7. The apparatus of claim 1, wherein the component cabins enclose respective sections and further comprising a section fixing element enclosed by the component cabins the transport facility.

8. The process of claim 1, further comprising axial partitions on the component cabins, wherein the axial partitions are parallel to a longitudinal axis of the sections.

9. The process of claim 1, wherein the flock cabins are adjacent to one another or spaced apart for encompassing a segment of the sections.

10. The process of claim 1, further comprising collection spaces below the separation walls for receiving remaining flocks and storage spaces connected to the respective collection spaces.

11. The apparatus of claim 1, further comprising section fixing elements in the transport facility for holding the sections with moist adhesive beds facing flock discharges from the flock cabins.

* * * * *